United States Patent
Lau et al.

(10) Patent No.: US 9,900,929 B2
(45) Date of Patent: Feb. 20, 2018

(54) CONTROLLING FREQUENCY OF USER DEVICE ACCESS TO A NETWORK

(71) Applicant: Verizon Patent and Licensing Inc., Arlington, VA (US)

(72) Inventors: Priscilla Lau, Fremont, CA (US); Suzann Hua, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 14/969,735

(22) Filed: Dec. 15, 2015

(65) Prior Publication Data

US 2017/0171909 A1    Jun. 15, 2017

(51) Int. Cl.
*H04J 3/00* (2006.01)
*H04W 76/06* (2009.01)
*H04W 76/02* (2009.01)
*H04L 29/08* (2006.01)
*H04W 72/12* (2009.01)

(52) U.S. Cl.
CPC ......... *H04W 76/068* (2013.01); *H04L 67/306* (2013.01); *H04W 72/1273* (2013.01); *H04W 76/02* (2013.01)

(58) Field of Classification Search
USPC .......... 370/230–329, 331–352; 709/204–229
See application file for complete search history.

(56) References Cited

U.S. PATENT DOCUMENTS

| | | | | |
|---|---|---|---|---|
| 8,363,546 B2* | 1/2013 | Freen | | H04W 72/04 370/230 |
| 9,001,655 B2* | 4/2015 | Watfa | | H04W 48/06 370/235 |
| 9,003,004 B2* | 4/2015 | Cho | | H04W 60/04 709/223 |
| 9,042,221 B2* | 5/2015 | Kim | | H04W 4/005 370/230 |
| 9,559,965 B2* | 1/2017 | Lee | | H04L 47/127 |
| 9,603,191 B2* | 3/2017 | Cleary | | H04W 28/08 |
| 9,648,110 B2* | 5/2017 | Kotecha | | H04L 67/141 |
| 2010/0302950 A1* | 12/2010 | Zhao | | H04L 47/10 370/242 |
| 2014/0341109 A1* | 11/2014 | Cartmell | | H04L 45/308 370/328 |
| 2015/0055469 A1 | 2/2015 | Lee et al. | | |

(Continued)

OTHER PUBLICATIONS

Wikipedia, "LTE (telecommunication)," https://en.wikipedia.org/wiki/LTE_(telecommunication), Dec. 4, 2015, 10 pages.

(Continued)

*Primary Examiner* — Man Phan

(57) ABSTRACT

A device may receive information identifying a service frequency for a user device. The device may start a service gap timer for the user device, with the service gap timer corresponding to the service frequency. The device may receive a service request from the user device. The device may determine whether the service gap timer has expired. The device may selectively accept or reject the service request based on determining whether the service gap timer has expired. The device may reject the service request when the service gap timer has not expired. The device may accept the service request when the service gap timer has expired.

21 Claims, 7 Drawing Sheets

(56) References Cited

U.S. PATENT DOCUMENTS

| | | |
|---|---|---|
| 2015/0215346 A1 | 7/2015 | Kotecha et al. |
| 2016/0192411 A1* | 6/2016 | Mori .................. H04W 74/002 370/329 |
| 2016/0249248 A1* | 8/2016 | Ronneke ........... H04W 28/0284 |
| 2017/0104843 A1* | 4/2017 | Cardillo ................ H04L 67/325 |

OTHER PUBLICATIONS

Wikipedia, "System Architecture Evolution," https://en.wikipedia.org/wiki/System_Architecture_Evolution, Nov. 15, 2015, 8 pages.
Wikipedia, "LTE Advanced," https://en.wikipedia.org/wiki/LTE_Advanced, Dec. 8, 2015, 19 pages.
Wikipedia, "Universal Mobile Telecommunications System," https://en.wikipedia.org/wiki/Universal_Mobile_Telecommunications_System, Dec. 1, 2015, 17 pages.
Wikipedia, "CDMA2000," https://en.wikipedia.org/wiki/CDMA2000, Aug. 18, 2015, 3 pages.
Wikipedia, "Code division multiple access," https://en.wikipedia.org/wiki/Code_division_multiple_access, Dec. 7, 2015, 10 pages.

\* cited by examiner

CONTROLLING FREQUENCY OF USER DEVICE ACCESS TO A NETWORK

BACKGROUND

Networks, including wireless networks, may be used for communications by various user devices, including machine-to-machine (M2M) and/or "Internet of Things" (IoT) devices. User devices consume network resources by sending or receiving data over the network. User devices also consume network resources each time a user device attempts to access the network to send or receive data over the network and/or to set up or maintain connectivity with the network.

DETAILED DESCRIPTION OF PREFERRED EMBODIMENTS

The following detailed description of example implementations refers to the accompanying drawings. The same reference numbers in different drawings may identify the same or similar elements.

Some user devices (e.g., some M2M or IoT devices, such as metering or location tracking devices) communicating over a network may send and/or receive relatively small amounts of data (e.g., less than one kilobyte or even less than one hundred bytes). Based on the small amounts of data, such user devices may be used with small (e.g., relatively inexpensive) data plans, which may only track total data usage in a given period. However, some such user devices may send/receive small data packages with a high frequency, consuming significant network resources each time the user devices access the network to set up a network connection. User devices that frequently send/receive small data packages (e.g., hundreds of bytes) may consume more network resources than user devices that send/receive much larger data packages (e.g., 500 megabytes) less frequently. Furthermore, some user devices (e.g., some M2M or IoT devices) may frequently (e.g., every few seconds) perform registration/attachment to a network in order to maintain radio connectivity, which may consume network resources that might otherwise be available to other devices. Implementations described herein may assist with tracking, controlling, and/or reducing network resources consumed by user devices that frequently request network services.

Figure 1A:
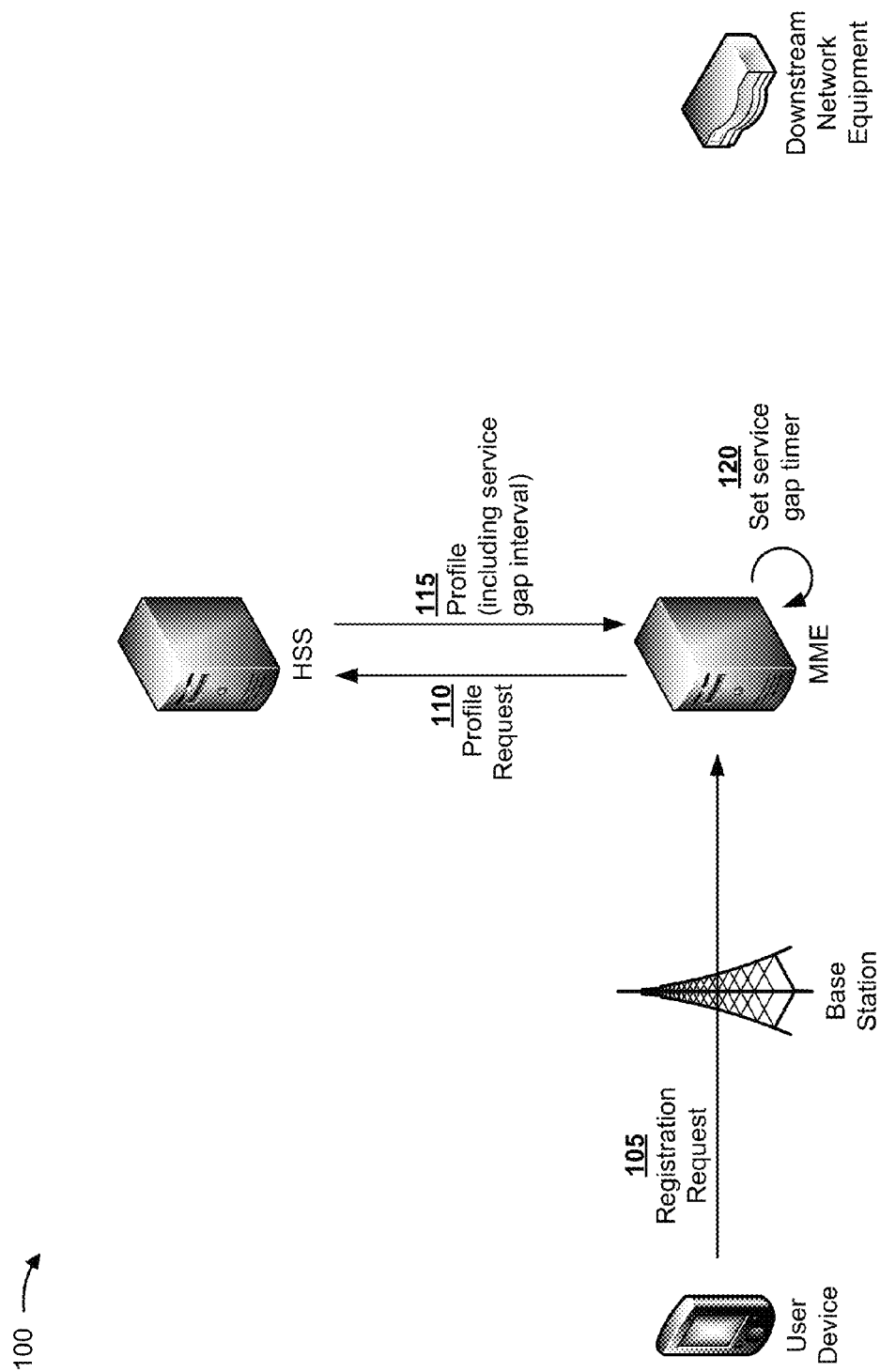
FIGS. 1A-1C are diagrams of an overview of an example implementation described herein.
Figure 1B:
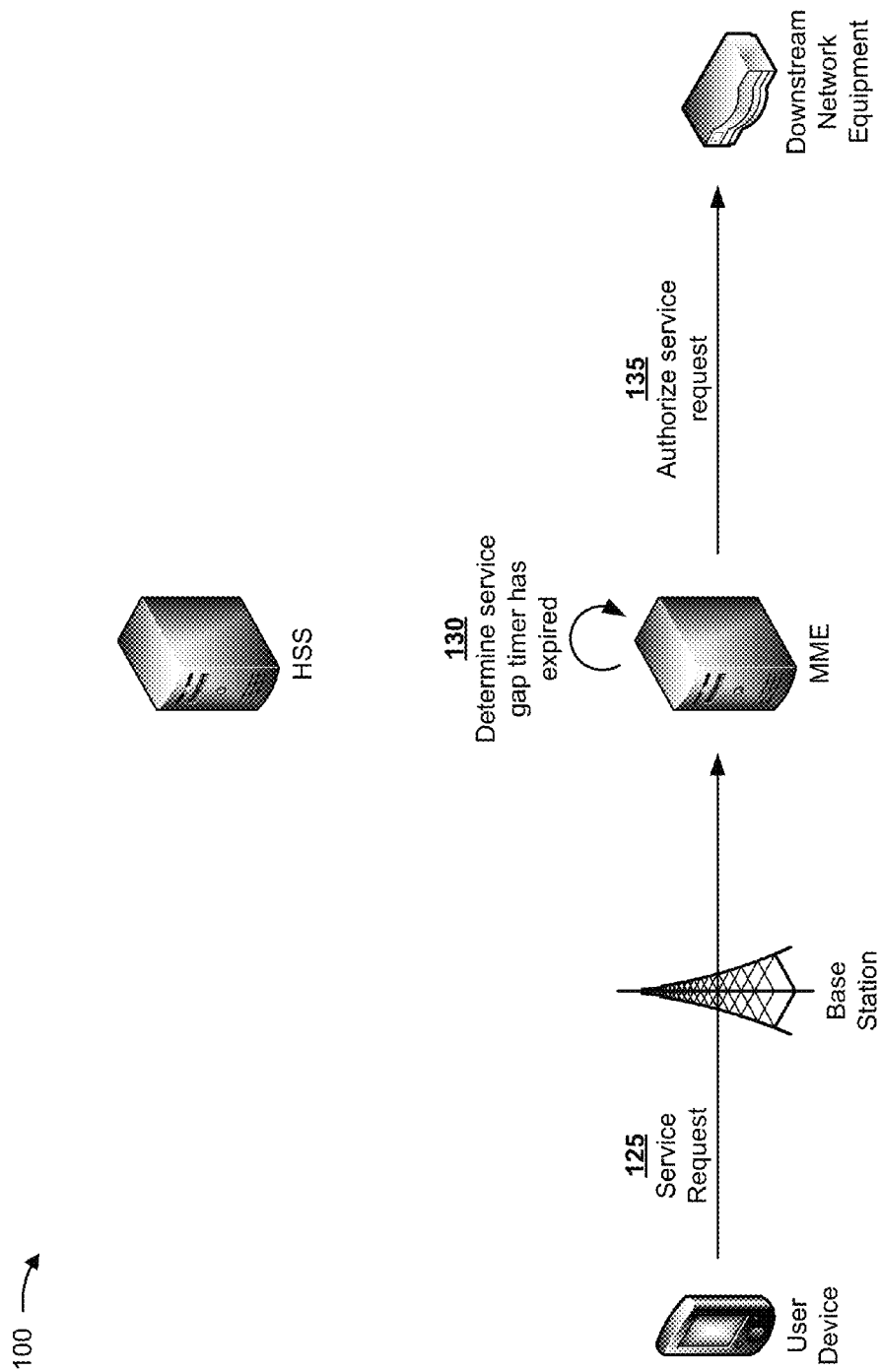
Figure 1C:
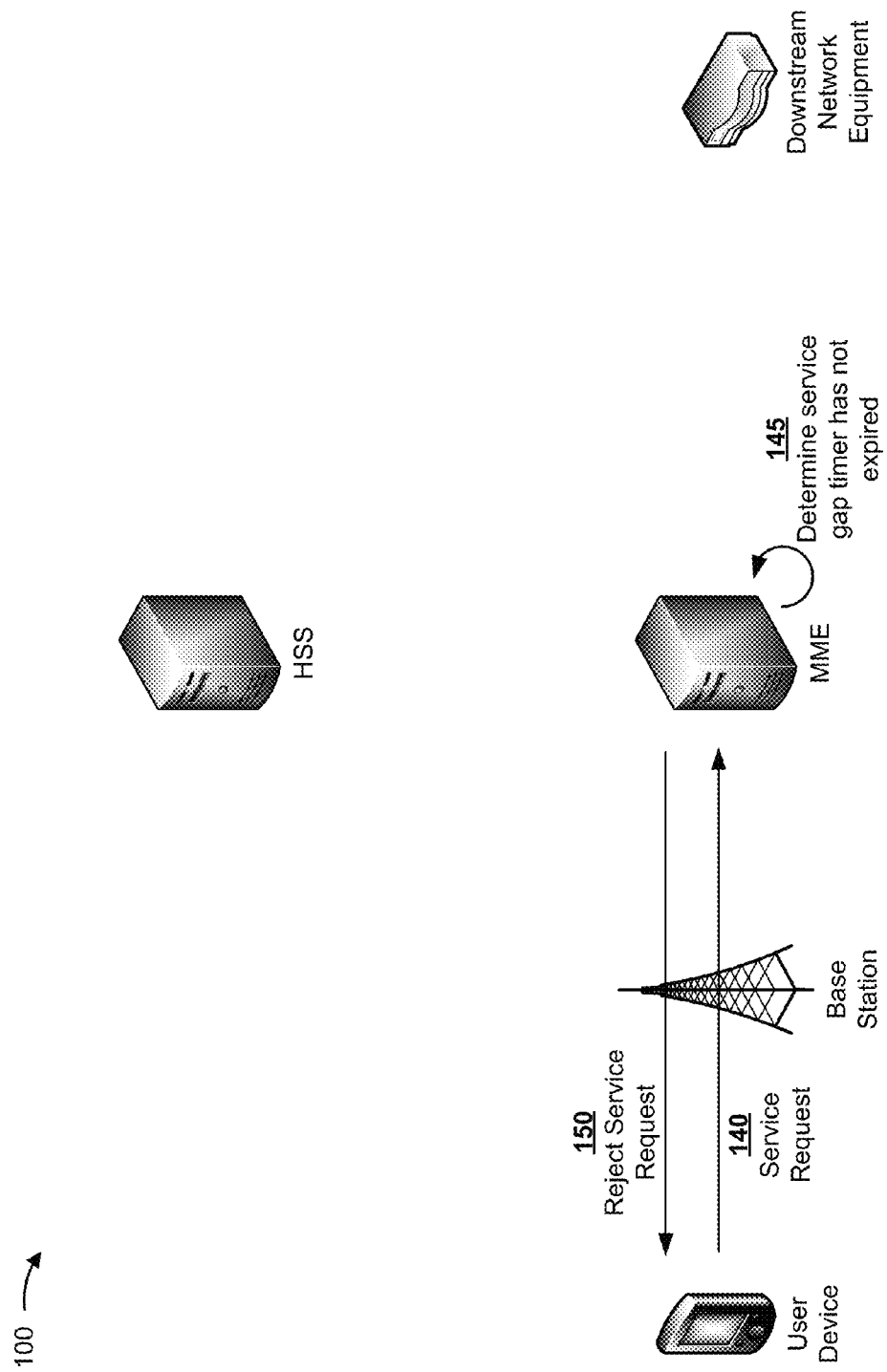

FIGS. 1A-1C are diagrams of an overview of an example implementation 100 described herein. As shown in FIG. 1A, assume that a user device (e.g., an M2M device, an IoT device, etc.) desires to set up a network connection with and/or through downstream network equipment (e.g., a serving gateway (SGW), a packet data network gateway (PGW), a short message service center (SMSC), etc.). As shown by reference number 105, the user device may send a registration request, via a base station, to a mobility management entity device (MME). As shown by reference number 110, based on the registration request received from the user device, the MME may send a profile request to a home subscriber server (HSS). As shown by reference number 115, based on receiving the profile request, the HSS may send, and the MME may receive, a profile (e.g., a subscriber profile for the user device) that may include a service gap interval. The profile may include one or more service gap intervals for the user device, as described below. As shown by reference number 120, the MME may set a service gap timer for the user device based on the service gap interval. Setting the service gap timer may include setting one or more service gap timers, as described below.

As shown in FIG. 1B, and by reference number 125, the user device may send a service request, via the base station, to the MME. As shown by reference number 130, based on receiving the service request, the MME may determine that the service gap timer has expired. For example, the MME may determine that a service gap timer corresponding to the service request has expired, as described below. As shown by reference number 135, based on determining that the service gap timer has expired, the MME may authorize the service request. For example, the MME may cause the downstream network equipment to set up a connection with the user device if the relevant (e.g., corresponding to the service request) service gap timer has expired and restart the relevant service gap timer upon authorizing the service request, unless there is a further control restriction.

As shown in FIG. 1C, and by reference number 140, the user device may send a service request, via the base station, to the MME. As shown by reference number 145, based on receiving the service request, the MME may determine that the service gap timer has not expired. For example, the user device may be sending service requests too frequently (i.e., more frequently than the count range of the service gap timer). The MME may determine that the service gap timer has not expired by determining that a service gap timer corresponding to the service request has not expired, as described below. As shown by reference number 150, based on determining that the service gap timer has not expired, the MME may reject the service request. For example, the MME may send a reject response to the user device via the base station.

In this way, the MME may track, control, reduce, and/or limit the frequency with which a user device requests network services. Tracking, controlling, reducing, and/or limiting the frequency with which a user device requests network services, in addition to monitoring the volume of data sent/received by the user device, may more completely reflect the network resources consumed by a user device. Thus, implementations described herein may reduce and/or capture network resources consumed by user devices that frequently request network services, including user devices that frequently send/receive relatively small amounts of data.

As indicated above, FIGS. 1A-1C are provided merely as an example. Other examples are possible and may differ from what was described with regard to FIGS. 1A-1C.

Figure 2:
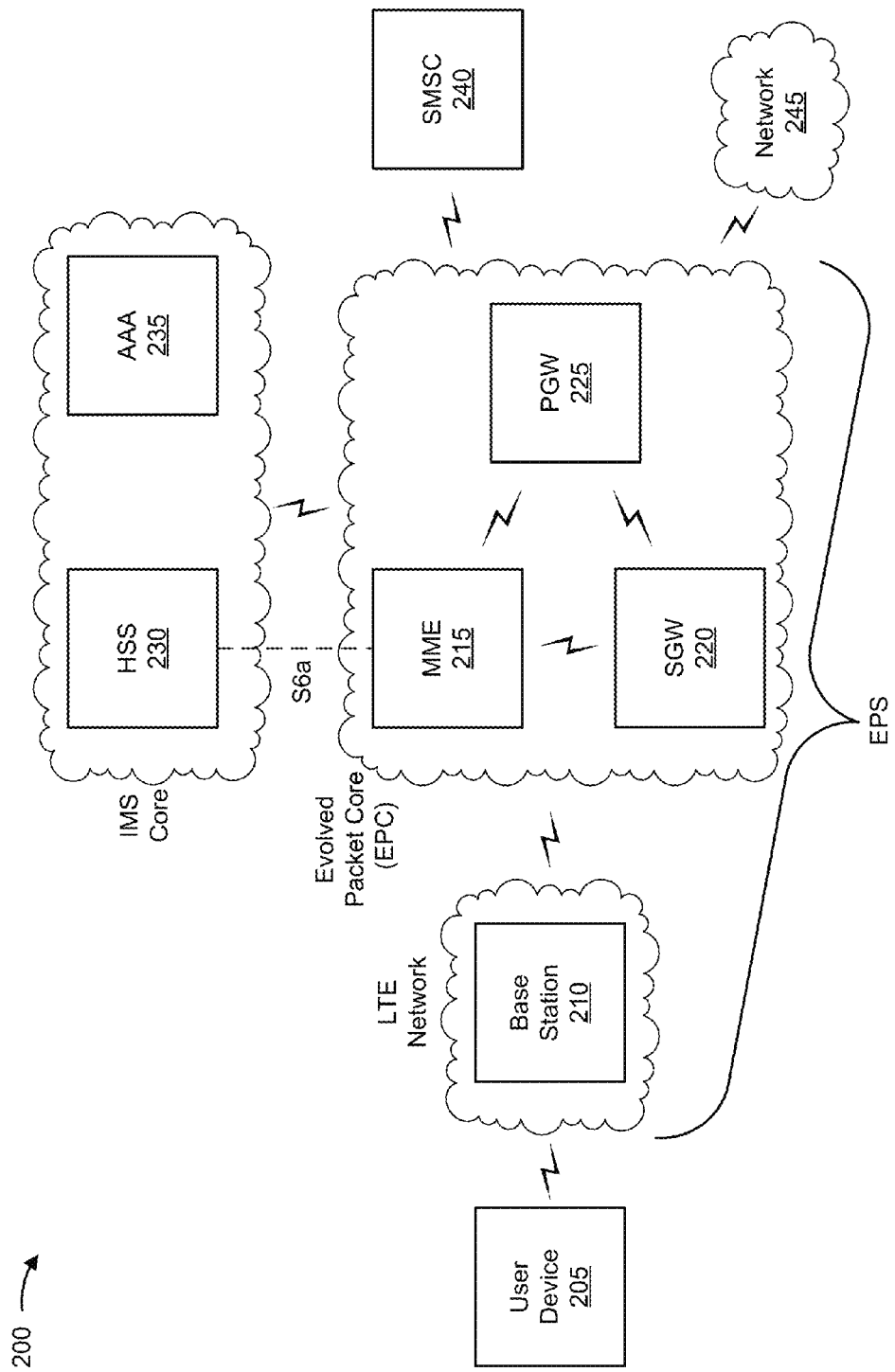
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a short message service center (SMSC) 240; and a network 245. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include MME 215, SGW 220, and/or PGW 225 that enable user device 205 to communicate with network 245 and/or an Internet protocol (IP) multimedia subsystem (IMS) core. The IMS core may include HSS 230 and/or AAA 235, and may manage device registration and authentication, session initiation, etc., associated with user devices 205. HSS 230 and/or AAA 235 may reside in the EPC and/or the IMS core.

User device 205 may include one or more devices capable of communicating with base station 210 and/or a network (e.g., network 245). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses, a smart watch, etc.), a machine device, and/or a similar device. User device 205 may send traffic to and/or receive traffic from network 245 (e.g., via base station 210, SGW 220, and/or PGW 225).

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a radio access network that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215). In some implementations, MME 215 may establish a signaling session with HSS 230 using an S6a interface.

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may also receive traffic from network 245 and/or other network devices, and may send the received traffic to user device 205 via base station 210. Additionally, or alternatively, SGW 220 may perform operations associated with handing off user device 205 to and/or from an LTE network.

PGW 225 may include one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to user device 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with user device 205. For example, HSS 230 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, a frequency of permitted network access, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with user device 205. For example, AAA 235 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, a frequency of network access attempts, etc.), and/or may perform similar operations.

SMSC 240 may include one or more devices, such as one or more server devices, that are capable of sending, receiving, storing, forwarding, converting, and/or delivering short message service (SMS) messages and/or maintaining time stamps for SMS messages. For example, SMSC 240 may maintain time stamps for, send, receive, store, forward, convert, and/or deliver SMS messages from, to and/or between user device 205, base station 210, MME 215, SGW 220, PGW 225, HSS 230, AAA 235 and/or network 245.

Network 245 may include one or more wired and/or wireless networks. For example, network 245 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
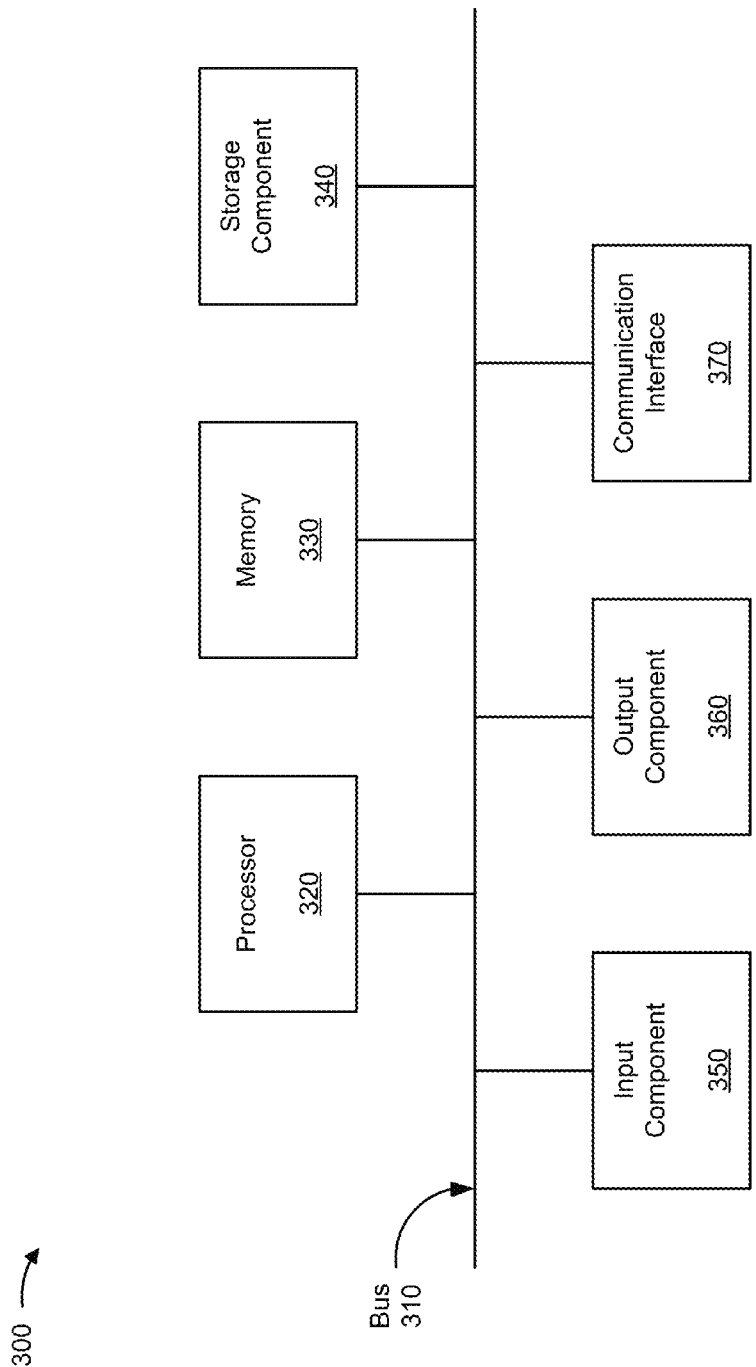
FIG. 3 is a diagram of example components of one or more devices of FIG. 2.

FIG. 3 is a diagram of example components of a device 300. Device 300 may correspond to user device 205, base station 210, MME 215, SGW 220, PGW 225, HSS 230, AAA 235, and/or SMSC 240. In some implementations, user device 205, base station 210, MME 215, SGW 220, PGW 225, HSS 230, AAA 235, and/or SMSC 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
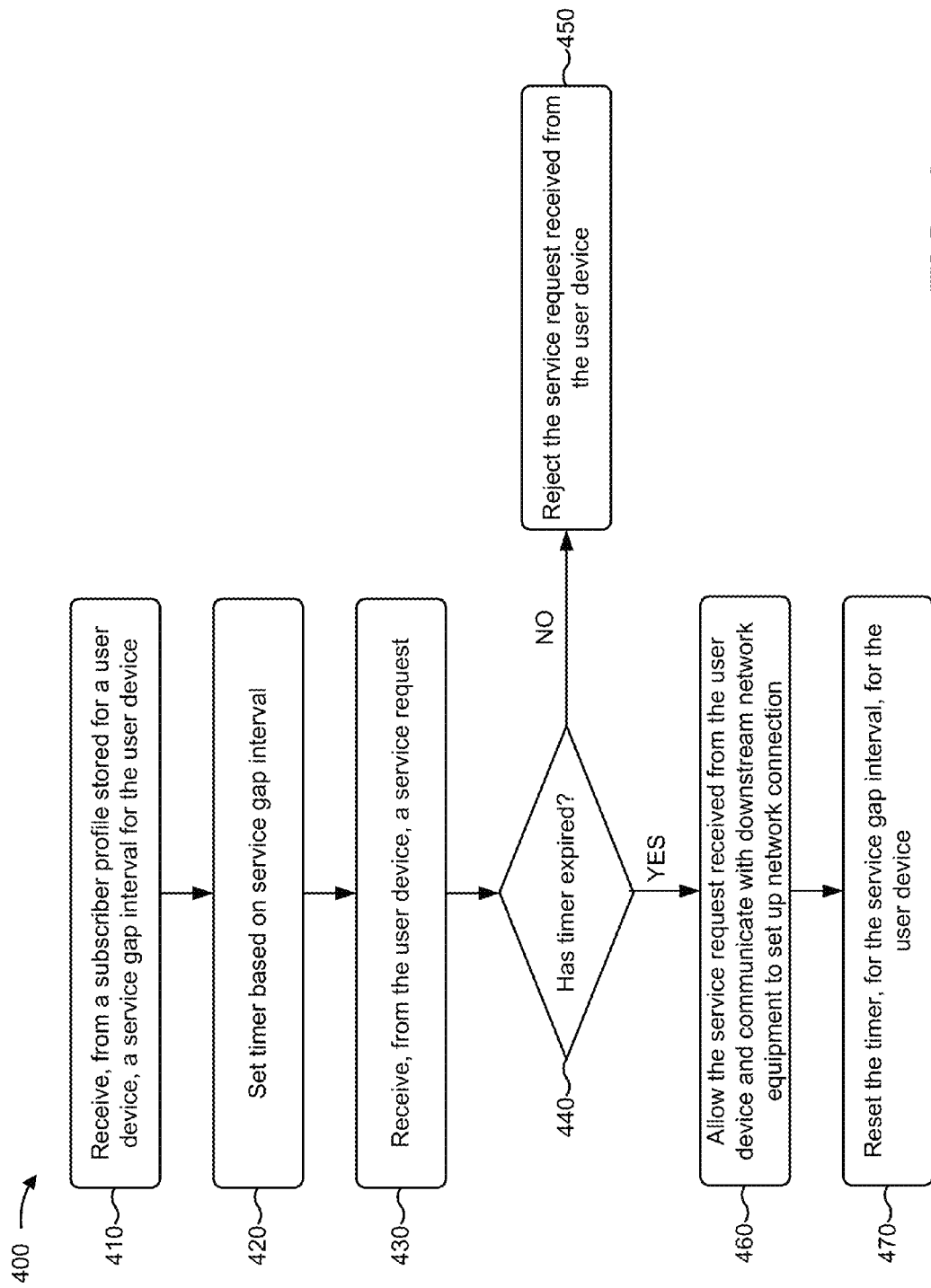
FIG. 4 is a flow chart of an example process for controlling frequency of user device access to a network.

FIG. 4 is a flow chart of an example process 400 for controlling frequency of user device access to a network. In some implementations, one or more process blocks of FIG. 4 may be performed by MME 215. In some implementations, one or more process blocks of FIG. 4 may be performed by another device or a group of devices separate from or including MME 215. For example, one or more process blocks of FIG. 4 may be performed by one or more devices shown in environment 200, such as user device 205, base station 210, SGW 220, PGW 225, SMSC 240, and/or other devices such as a mobile switching center (MSC) or a serving general packet radio service (GPRS) support node (SGSN).

As shown in FIG. 4, process 400 may include receiving, from a subscriber profile stored for a user device, a service gap interval for the user device (block 410). For example, MME 215 may receive a service gap interval and/or period for user device 205, such as from HSS 230 via the S6a interface. In some implementations, the service gap interval for user device 205 may be provisioned and/or stored in a subscriber profile, which may be stored by HSS 230. In some implementations, MME 215 may receive the service gap interval when user device 205 attaches/registers to a network (e.g., the LTE network).

A user (e.g., a customer, a subscriber, an owner, an operator, and/or a manufacturer of user device 205) may sign up for a service plan (e.g., voice, data, M2M, IoT, or another service) for user device 205. For example, the user may select a plan type (e.g., data and/or voice) and a data usage, allotment, and/or quota (e.g., a quantity and/or amount of data consumption and/or number of minutes of usage allowed per time period, such as per day, per month, per year, etc.). The user may also select, purchase, and/or be assigned a frequency and/or interval at which user device 205 may access and/or use the network to send and/or receive data (e.g., once per day, twice per hour, every 15 minutes, etc.).

Based on the selected, purchased, and/or assigned network access and/or use frequency and/or interval, the network operator may provision, in the subscriber profile for user device 205, a corresponding service gap interval (e.g., 24 hours, 30 minutes, 15 minutes, etc.) during which user device 205 will not be permitted to access and/or use the network (e.g., to send and/or receive data). In some implementations, the cost for the service plan may be a function of one or more of the plan type, data usage, and/or service frequency. For example, a plan having a higher service frequency (e.g., a shorter service gap interval) may be more expensive than a plan having a lower service frequency (e.g., a longer service gap interval).

In some implementations, two or more service gap intervals, at least some of which may be associated with different types of service requests and/or different forms of communication, may be provisioned and/or stored in the subscriber profile for user device 205. For example, the subscriber profile may include a first service gap interval associated with data or user plane service requests (e.g., for data communication that involves a physical bearer connection) and a second service gap interval associated with control plane service requests (e.g., for data communication that does not involve a physical bearer connection). In some implementations, the subscriber profile may include a service gap interval associated with requests to attach/register to the network (e.g., the LTE network), which may prevent user device 205 from attempting to remain attached to the LTE network. Additionally, or alternatively, the subscriber profile may include a service gap interval associated with any network service that the service operator or other entity is interested in controlling and/or tracking.

The service gap intervals associated with different forms of communication and/or network services may be different, in some implementations. For example, a service gap interval associated with control plane service requests may be different than a service gap interval associated with data or user plane service requests. The service gap intervals associated with different forms of communication and/or network services may be the same, in some implementations.

In some implementations, the length of a service gap interval may be related and/or proportional to the network resources used by the network service associated with the service gap interval. For example, a service gap interval associated with control plane service requests may be shorter than a service gap interval associated with data or user plane service requests.

As further shown in FIG. 4, process 400 may include setting a timer based on the service gap interval (block 420). For example, MME 215 may set a service gap timer, based on the service gap interval received from HSS 230, for user device 205 that MME 215 serves.

In some implementations, MME 215 may set two or more service gap timers for user device 205, based on multiple service gap intervals received from HSS 230. For example, if the subscriber profile for user device 205 includes multiple service gap intervals, MME 215 may use or maintain multiple service gap timers for user device 205, which may include a separate service gap timer for each service gap interval (e.g., separate service gap timers for control plane service requests and data or user plane service requests, etc.) stored in the subscriber profile for user device 205. In some implementations, at least some of the multiple service gap timers may run for the same time interval. In some implementations, at least some of the multiple service gap timers may run for different time intervals.

The service gap timer may be of any suitable configuration for tracking the service gap interval received from HSS 230. In some implementations, the service gap timer may be a countdown timer, which starts, at a value corresponding to the service gap interval, when MME 215 detects a suitable triggering event, as discussed in more detail below, and runs until the service gap timer reaches zero. For example, if the service gap interval is 30 minutes, the service gap timer may start with or at 30 minutes and run until the service gap timer reaches zero (e.g., at 30 minutes). In some implementations, the service gap timer may start at a suitable time or point (e.g., zero) and run until the service gap timer reaches the service gap interval or another suitable ending or stopping time.

MME 215 may start the service gap timer based on MME 215 detecting a suitable triggering event. For example, MME 215 may start a service gap timer upon: MME 215 detecting that user device 205 has attached/registered to the network or has attempted to do so; MME 215 receiving a service request from user device 205; MME 215 detecting start of service for user device 205; and/or MME 215 receiving, from user device 205, a signaling message associated with any network service and/or activity the network operator is interested in controlling and/or tracking.

In some implementations, where the subscriber profile for user device 205 includes multiple service gap intervals, MME 215 may start a service gap timer for one, some, or all of the stored service gap intervals based on a suitable triggering event identified for the one, some, or all of the stored service gap intervals. For example, MME 215 may start all service gap timers based on any triggering event, or MME 215 may start one service gap timer, or some of the service gap timers, based on a particular specified event (e.g., start a service gap timer for control plane service requests based on receiving a control plane service request, start a service gap timer for data or user plane service requests based on receiving a data or user plane service request, etc.).

In some implementations, MME 215 may store, for user device 205, a service gap timer or timers for a suitable period of time. For example, MME 215 may store a service gap timer for as long as a user profile is stored by MME 215. Additionally, or alternatively, MME 215 may purge or delete a service gap timer when user device 205 explicitly de-registers or is de-attached from the network or after a predefined threshold time has passed.

As further shown in FIG. 4, process 400 may include receiving, from the user device, a service request (block 430). For example, MME 215 may receive a service request from user device 205. In some implementations, where the subscriber profile for user device 205 includes multiple service gap intervals (e.g., for control plane service requests, data or user plane service requests, requests to attach/register to the network (e.g., the LTE network), signaling messages, other activities to be controlled/tracked, etc.), MME 215 may distinguish different types of service requests and determine which type of service request has been received. For example, MME 215 may determine that the service request is a request to set-up a voice call, transmit data over the network, establish or maintain radio connectivity with the network, etc.

As further shown in FIG. 4, process 400 may include determining whether the timer has expired (block 440). For example, MME 215 may, upon receipt of a service request from user device 205, determine if a service gap timer for user device 205 has expired. In some implementations, MME 215 may determine that the service gap timer has expired when the service gap timer is no longer running (e.g., when the service gap timer has reached zero for a countdown timer, or when the service gap timer has reached the service gap interval or another time period for a count-up timer). In some implementations, MME 215 may determine that the service gap timer has expired when the service gap timer is within a predefined threshold (e.g., within about 0.1%, 0.5%, 1%, 5%, etc. of the service gap interval) either before or after the service gap timer has reached zero or the service gap interval.

In some implementations, where the subscriber profile for user device 205 includes multiple service gap intervals (e.g., for control plane service requests, data or user plane service requests, requests to attach/register to the network (e.g., the LTE network), signaling messages, other activities to be controlled/tracked, etc.), MME 215 may determine if the service gap timer corresponding to the received service request has expired.

As further shown in FIG. 4, if the timer has not expired (block 440—NO), process 400 may include rejecting the service request received from the user device (block 450). For example, if MME 215 determines that a service gap timer for user device 205 has not expired, MME 215 may reject or deny the service request. In some implementations, if MME 215 determines that a service gap timer for user device 205 has not expired, MME 215 may determine and/or provide a corresponding indication or notice (e.g., to user device 205) that user device 205 is making a service request too soon (e.g., less than a service gap interval since a first or most recent prior request) or that user device 205 is making service requests too frequently (e.g., at higher than a permitted frequency and/or rate).

In some implementations, MME 215 may provide, to user device 205, a time-to-wait indication or notification when or if MME 215 has determined that the service gap timer for user device 205 has not expired. For example, MME 215 may notify user device 205 how long user device 205 should and/or needs to wait before requesting service again. In some implementations, the time-to-wait indication may encourage and/or prompt user device 205 to wait for the indicated time period so as to avoid expending and/or consuming network resources based on, for example, additional and/or repeated rejected service requests and/or failed requests to attach/register to the network.

As further shown in FIG. 4, if the timer has expired (block 440—YES), process 400 may include allowing the service request received from the user device and communicating with downstream network equipment to set up a network connection for the user device (block 460). For example, if MME 215 determines that the service gap timer for user device 205 has expired, MME 215 may allow and/or accept the service request from user device 205. If MME 215 allows and/or accepts the service request, MME 215 may communicate with downstream network equipment (e.g., SGW 220 and/or PGW 225 for data or user plane service requests or SMSC 240 for control plane service requests) to set up the requested network connection so that user device 205 can communicate via a network (e.g., an LTE network), or MME 215 may permit user device 205 to attach/register to a network (e.g., an LTE network). For example, MME 215 may send an instruction, to the downstream network equipment, to establish a network connection with user device 205, to provide a requested network service.

In some implementations, if MME 215 determines that the service gap timer for user device 205 has expired, MME 215 may determine that an interval since a prior service request by user device 205 is greater than or equal to a service gap interval for user device 205 or that user device 205 is making service requests at, or at less than, a permitted frequency and/or rate.

As further shown in FIG. 4, process 400 may include resetting the timer, for the service gap interval, for the user device (block 470). For example, if MME 215 determines that the service gap timer for user device 205 has expired and/or MME 215 has allowed the service request from user device 205, MME 215 may reset the service gap timer (e.g., for the service gap interval for user device 205), which may block service requests from user device 205 during the service gap interval after the allowed service request. In some implementations, where the subscriber profile for user device 205 includes multiple service gap intervals, MME 215 may reset the service gap timer corresponding to the allowed service request or MME 215 may reset some or all of multiple service gap timers it maintains for user device 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
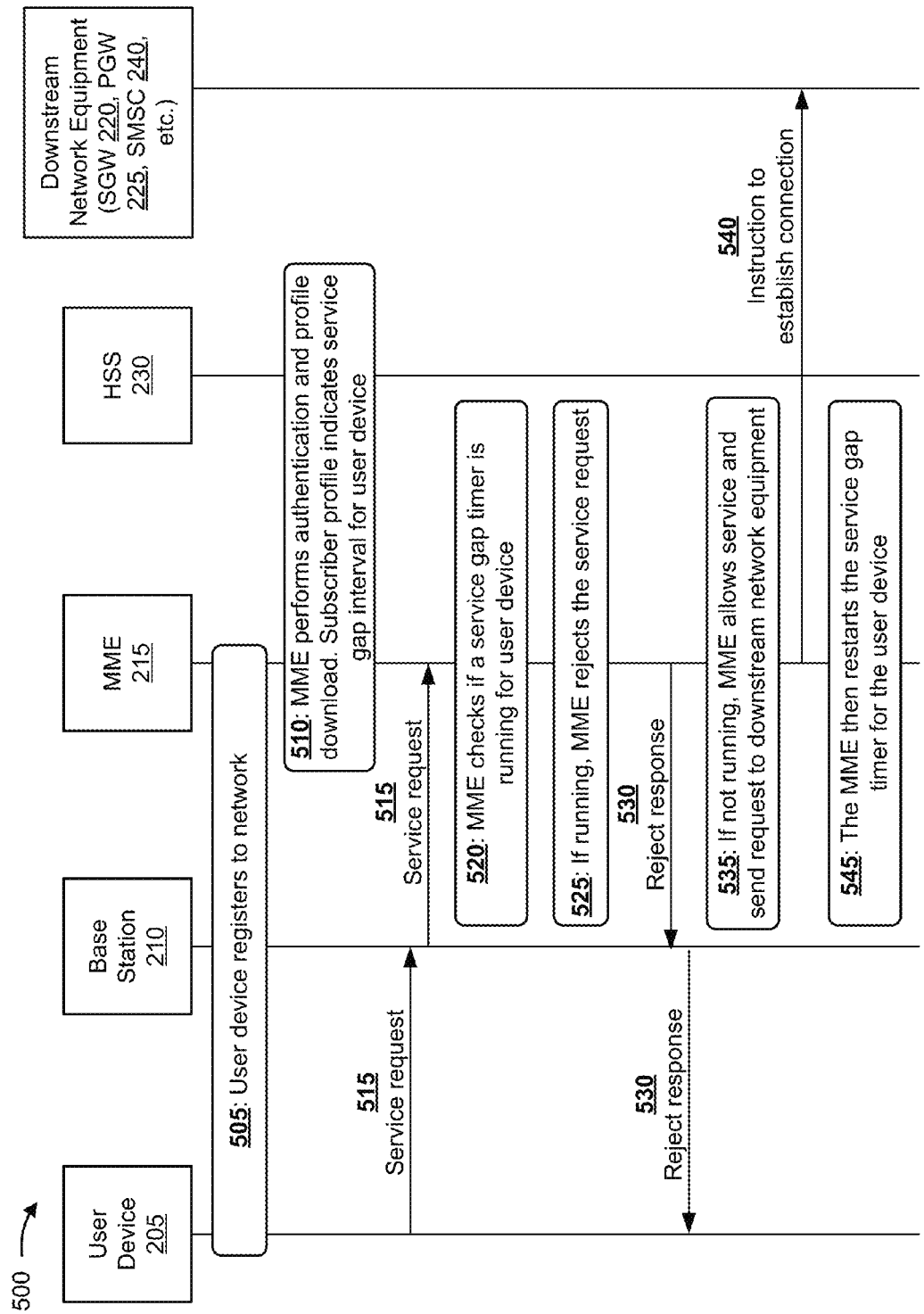
FIG. 5 is a call flow diagram of an example call flow for controlling frequency of user device access to a network.

FIG. 5 is a call flow diagram of an example call flow 500 for controlling frequency of user device access to a network. FIG. 5 shows an example of a user device requesting network service, and either having its service request denied, if a service gap timer is running, or allowed, if the service gap timer is not running (e.g., where the timer has expired).

As shown in FIG. 5, and by reference number 505, user device 205 may register to a network. As shown by reference number 510, MME 215 may perform an authentication and profile download, during which a subscriber profile for user device 205 may be transmitted from HSS 230 to MME 215. As further shown by reference number 510, the subscriber profile may indicate a service gap interval for user device 205.

As shown in FIG. 5, and by reference number 515, user device 205 may send a service request, which is received by base station 210 and transmitted to MME 215. As shown by reference number 520, MME 215 may check if a service gap timer is running for user device 205 based on receiving the service request.

If the service gap timer is running for user device 205 (e.g., MME 215 has a service gap timer, for user device 205, that has not expired), MME 215 may reject the service request, as shown by reference number 525. If MME 215 rejects the service request, MME 215 may send a reject response to base station 210, which may transmit the reject response to user device 205, as shown by reference number 530.

If the service gap timer is not running for user device 205 (e.g., MME 215 has a service gap timer, for user device 205, that has expired), MME 215 may allow the service request and send the service request to downstream network equipment (e.g., SGW 220, PGW 225, SMSC 240, etc.), as shown by reference number 535. In some implementations, a service gap timer may not be running for user device 205 where user device 215 has not previously transmitted a service request (e.g., where the presently considered service request is the first service request from user device 205). MME 215 may also send an instruction, to the downstream network equipment, to establish a connection with user device 205, as shown by reference number 540. MME 215 may then restart a service gap timer for user device 205, as shown by reference number 545.

As indicated above, FIG. 5 is provided merely as an example. Other examples are possible and may differ from what was described with regard to FIG. 5.

Implementations described herein may track, control, reduce, and/or limit the frequency and/or rate at which user devices access and/or request services from a network. Tracking, controlling, reducing, and/or limiting the frequency and/or rate at which user devices access and/or request services from a network may reduce and/or capture the network resources consumed by user devices, including user devices that frequently send/receive small data packages over the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive, from a profile stored for a user device, a plurality of service gap intervals for the user device;
   set a plurality of timers, for the user device, based on the plurality of service gap intervals;
   receive, from the user device, a service request;
   determine, for the service request, a type of service request;
   determine, based on the type of service request, that one timer of the plurality of timers is a corresponding timer for the service request;
   determine whether the corresponding timer for the service request has expired; and
   selectively reject or allow the service request based on determining whether the corresponding timer has expired,
   the service request being rejected when the corresponding timer has not expired, and
   the service request being allowed when the corresponding timer has expired, and the one or more processors, when allowing the service request when the timer has expired, are to:
   communicate with downstream network equipment to set up a network connection for the user device.

2. The device of claim 1, where the one or more processors, when allowing the service request when the corresponding timer has expired, are further to reset the plurality of timers for the plurality of service gap intervals.

3. The device of claim 1, where the plurality of service gap intervals are associated with a plurality of different types of service requests.

4. The device of claim 1, where the one or more processors, when rejecting the service request when the corresponding timer has not expired, are to:
send, to the user device, a notification that the corresponding timer has not expired.

5. The device of claim 1, where the service request, received from the user device, is a second service request; and
where the one or more processors are further to:
start the corresponding timer based on receiving a first service request from the user device,
the first service request being received, from the user device, prior to the second service request being received, from the user device.

6. The device of claim 1, where the service request, received from the user device, is a first service request; and
where the one or more processors are further to:
receive a second service request,
where the first service request is a request for a control plane service and the second service request is a request for data plane services.

7. The device of claim 1, where a first service gap interval, of the plurality of service gap intervals, is associated with a first service request and a second service gap interval is associated with a second service request.

8. A non-transitory computer-readable medium storing instructions, the instructions comprising:
one or more instructions that, when executed by one or more processors, cause the one or more processors to:
receive, from a subscriber profile stored for a user device, information identifying a first service frequency for the user device and a second service frequency for the user device;
start a first service gap timer, corresponding to the first service frequency, for the user device, and a second service gap timer, corresponding to the second service frequency, for the user device;
where the first service frequency corresponds to a first network service and the second service frequency corresponds to a second network service, the first network service being different from the second network service;
receive, from the user device, a request for a network service;
determine, for the requested network service, a network service type;
determine, based on the network service type for the requested network service, that one of the first service gap timer or the second service gap timer is a corresponding service gap timer for the requested network service;
determine whether the corresponding service gap timer has expired; and
selectively deny or provide the requested network service based on determining whether the corresponding service gap timer has expired,
the requested network service being denied when the corresponding service gap timer has not expired, and
the requested network service being provided when the corresponding service gap timer has expired.

9. The non-transitory computer-readable medium of claim 8, where the one or more instructions, that cause the one or more processors to selectively deny or provide the requested network service based on determining whether the corresponding service gap timer has expired, cause the one or more processors to:
cause a network connection to be established with downstream network equipment to provide the requested network service for the user device when the corresponding service gap timer has expired; and
restart the corresponding service gap timer.

10. The non-transitory computer-readable medium of claim 8, where the one or more instructions, that cause the one or more processors to selectively deny or provide the requested network service based on determining whether the corresponding service gap timer has expired, cause the one or more processors to:
send, to the user device, a notification that the corresponding service gap timer has not expired when denying the requested network service.

11. The non-transitory computer-readable medium of claim 8, where the request for the network service, received from the user device, is a second request for network service; and
where the one or more instructions, when executed by the one or more processors, further cause the one or more processors to:
start the corresponding service gap timer based on receiving, from the user device, a first request for network service,
the first request for network service being received, from the user device, prior to the second request for network service being received, from the user device.

12. The non-transitory computer-readable medium of claim 8, where the one or more instructions, that cause the one or more processors to start the corresponding service gap timer, cause the one or more processors to:
start the corresponding service gap timer based on detecting a triggering event,
where the triggering event includes one of:
receiving a service request from the user device,
detecting a start of service for the user device, or
receiving a signaling message associated with a network operator.

13. The non-transitory computer-readable medium of claim 8, where the one or more instructions, further cause the one or more processors to:
delete the corresponding service gap timer for the user device when:
the user device is de-registered or de-attached from a network, or
when a predetermined threshold of time has passed.

14. The non-transitory computer-readable medium of claim 8, where the one or more instructions, that cause the one or more processors to selectively deny or provide the requested network service based on determining whether the corresponding service gap timer has expired, cause the one or more processors to:
provide a time-to-wait indication to the user device.

15. A method, comprising:
receiving, by a device, information identifying a plurality of service frequencies for a user device,
at least some of the plurality of service frequencies corresponding to a plurality of different types of service requests;

starting, by the device, a plurality of service gap timers, corresponding to the plurality of service frequencies, for the user device,
the plurality of service gap timers including the plurality of service frequencies;
receiving, by the device, a service request from the user device;
determining, for the service request, a type of service request;
determining, by the device and based on the type of service request, that one of the plurality of service gap timers is a corresponding service gap timer for the service request;
determining, by the device, whether the corresponding service gap timer has expired; and
selectively accepting or rejecting, by the device, the service request based on determining whether the corresponding service gap timer for the service request has expired,
the service request being rejected when the corresponding service gap timer has not expired, and
the service request being accepted when the corresponding service gap timer has expired.

16. The method of claim 15, where accepting the service request comprises:
causing, by the device, a network connection, for the user device, to be established with downstream network equipment; and
restarting, by the device, the plurality of service gap timers.

17. The method of claim 15, where rejecting the service request when the corresponding service gap timer has not expired comprises:
sending, to the user device, a notification that the plurality of service gap timers has not expired.

18. The method of claim 15, where the service request, from the user device, is a second service request; and where starting the corresponding service gap timer comprises:
starting the corresponding service gap timer based on receiving a first service request from the user device,
the first service request being received, by the device, prior to the second service request being received by the device.

19. The method of claim 15, where accepting the service request comprises:
causing a network connection, for the user device, to be established with downstream network equipment; and
restarting the corresponding service gap timer.

20. The method of claim 15, further comprising:
performing an authentication for the user device.

21. The method of claim 15,
where the service request is a first service request,
the method further comprising:
receiving a second service request,
where the first service request is a request for a control plane service and the second service request is a request for data plane service request, and
where a service interval gap for the control plane service is shorter than a service gap interval for the data plane service request.

* * * * *